United States Patent [19]
Ueda et al.

[11] 3,721,003
[45] March 20, 1973

[54] METHOD FOR ATTACHING WIRES TO A FLAT ARTICLE

[75] Inventors: Kazunori Ueda, Neyagawa; Eiichi Masuo, Moriguchi; Hiroaki Yagi, Higashi-Sumiyo-shi, Osaka; Sinya Nishimoto, Suita, all of Japan

[73] Assignee: Matsashita Electric Industrial Co., Ltd., Osaka, Japan

[22] Filed: Oct. 23, 1970

[21] Appl. No.: 83,319

[30] Foreign Application Priority Data

Oct. 27, 1969 Japan ..............................44/86237
Oct. 27, 1969 Japan ..............................44/86238
Oct. 27, 1969 Japan ..............................44/86239

[52] U.S. Cl. ...............29/628, 29/446, 29/452, 29/470.5, 29/475
[51] Int. Cl. ....................H01r 43/00, H05k 43/00
[58] Field of Search..........29/471.1, 25.42, 446, 452, 29/475, 493, 628, 470.5

[56] References Cited

UNITED STATES PATENTS

| 2,766,510 | 10/1966 | Heibel | 29/25.42 |
| 3,038,242 | 6/1962 | Riley | 29/25.42 |
| 3,231,082 | 1/1966 | Weiss | 206/56 |
| 3,315,331 | 4/1967 | Weiss | 29/25.42 |
| 3,585,472 | 1/1970 | Dornfeld | 27/25.42 |
| 3,588,974 | 6/1971 | Hansen et al. | 29/25.42 |

*Primary Examiner*—J. Spencer Overholser
*Assistant Examiner*—Richard B. Lazarus
*Attorney*—Stevens, Davis, Miller & Mosher

[57] ABSTRACT

A method of attaching lead wires to both surfaces of a disk-shaped electric article such as a ceramic capacitor prior to soldering the wires to the article, wherein the disk-shaped article is first inserted between unevenly crossed end portions of a resilient conductive wire member bent in the shape of a hairpin and then turned a half round about the longitudinal axis of the wire member while the bent portion of the wire member is unmovably held, so that the article is firmly gripped between wires; and a machine which automatically performs the above-described process.

3 Claims, 14 Drawing Figures

FIG. 9a
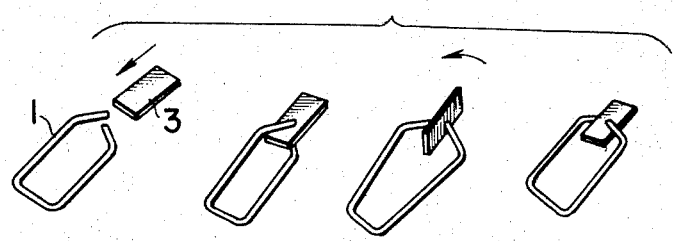
FIG. 9b
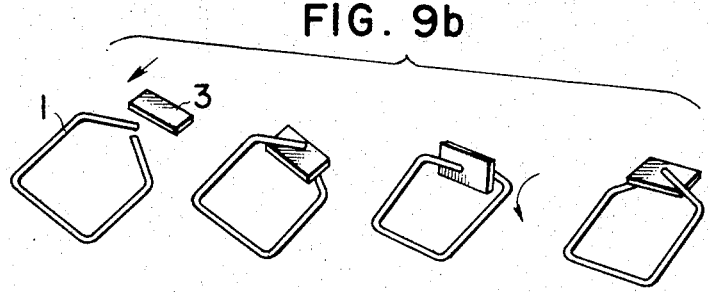
FIG. 10a     FIG. 10b
   

METHOD FOR ATTACHING WIRES TO A FLAT ARTICLE

This invention relates to a method for fabricating an electric article and a machine for effecting the method, more particularly to a method of attaching lead wires to both surfaces of a flat piece of electric article such as a disk-type ceramic capacitor, thermistor or varistor and to a machine which automatically performs such a method.

This invention will be clarified in the following description given with reference to the accompanying drawings in which;

FIGS. 9a and 9b are other examples of the process of this invention;

FIGS. 10a and 10b show a desirable and a undesirable shape of a wire member used for this invention.

Figure 1A:
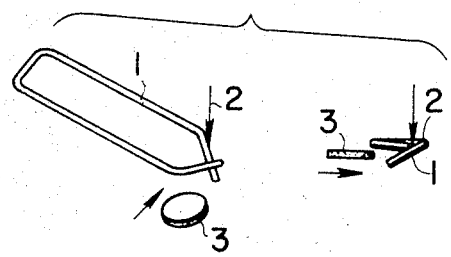
FIGS. 1a and 1b are schematic diagrams showing the conventional process of fabrication.
Figure 1B:
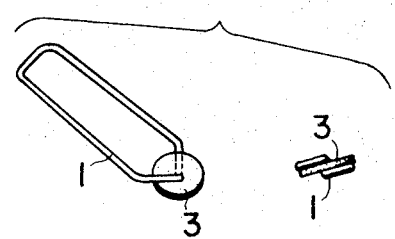

As is shown in FIGS. 1a and 1b, the conventional method of attaching lead wires to a flat electric article 3 such as a disk-type ceramic capacitor comprises the first step in which one of crossed ends of a conductive wire member 1 formed in the shape of a hair-pin is pushed down to make a gap between the wires by imposing a force at the bent portion of the wire 1 as indicated by arrows 2 in FIG. 1a, and the second step in which the flat article is inserted into the gap between wires, concurrently the force being removed to allow the wires to grip the article 3 as shown in FIG. 1b. According to the above-described conventional method, however, the article 3 is not gripped sufficiently firmly by the wire member 1. It is not uncommon that the article drops from the wire member during the next process in which the latter is soldered to the former, thus resulting in a poor yield of the products.

The primary object of this invention is to solve the above-mentioned problem encountered in the conventional process and to provide a new method for firmly holding the flat article between both ends of the wire members.

The second object of this invention is to provide a fabricating machine which operates to effect the above-mentioned new method.

In order to achieve the above object, the method of this invention for attaching wires to both surfaces of a flat piece of article comprises the steps of inserting said article into a gap provided between unevenly crossed end portions of a resilient wire member formed in the shape of a hairpin or a loop, and turning said article a half round in relation to said wire member so that said end portions change the side in relation to said article.

Figure 2:
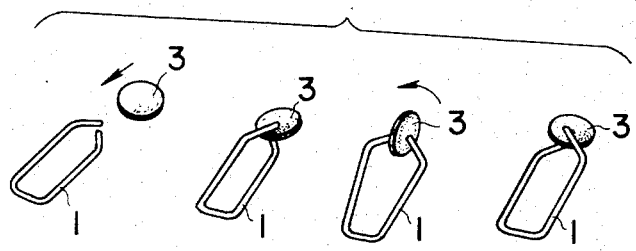
FIG. 2 is a diagram showing the process according to this invention.

Referring to FIG. 2 which shows the steps of the method of this invention, reference numeral 1 designates a hairpin-shaped wire member of a more or less resilient material both ends of which are unevenly bent so as to mutually cross providing a gap between them, and numeral 3 designates a flat article such as a disk-type ceramic capacitor, thermistor or varistor. Firstly, the flat article 3 is pushed into the gap at the crossed end of the wire member 1. Then, the article 3 is gripped with a tool (not shown) and rotated approximately a half round about the longitudinal axis of the hairpin-shaped wire member 1 while the U-shaped end of the wire member 1 is held in position. Thus, the article 3 is firmly held between the end portions of the wire members 1 by the resilient force of the wire members. The fabricated assembly is then delivered to a soldering station, where the wire ends are soldered to the article; and finally the U-shaped end of the wire member 1 is cut off to separate it into two parts.

Next, a machine for practising the abovedescribed method will be described in detail with reference to FIGS. 3 to 8. Of course, the machine described hereunder is an example of many arrangements possible for effecting the same method.

The machine consists of four major assemblies, that is, an article feeder 7, a process assembly 8, a wire member feeder 10 and a drive system including an electric motor 11, a reduction device 12 and other transmission mechanisms. The article feeder 7 includes a chute 4, a supply disk 5 and a rotor 6. The articles 3 fed to the supply disk 5 through the chute 4 are delivered to the rotor 6 so that each article is accommodated in each of recesses 13 regularly provided along the periphery of the rotor 6. As the rotor 6 rotates, each article 3 carried on the rotor is ejected from it by a mechanism which will be described in detail hereinafter and delivered to each of fingers 9 in the process assembly 8. Each finger is mounted on each of slide blocks 16 supported by a pair of endless chains 14 through the medium of attachments 15. It will be noted that the advance movement of the endless chains 14 are synchronized with the rotation of the rotor 6 of the article feeder 7 through a shaft 17 which drives the endless chains 14, and by way of bevel gears 18, 18', a shaft 19, spur gears 20, 21 and the rotor shaft 22. Further, the supply disc 5 is driven through shaft 24 and spur gear 23 which engages with the gear 21.

Figure 5:
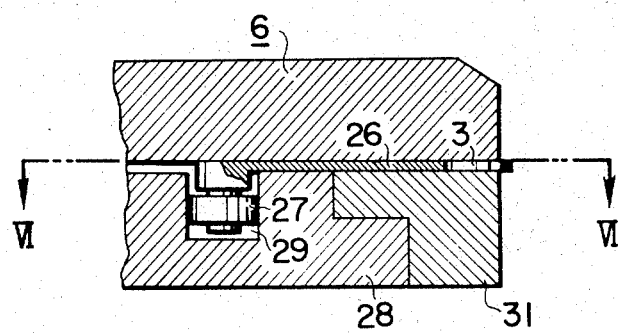
FIG. 5 is a sectioned and enlarged view of a part of the rotor portion of the same machine.
Figure 6:
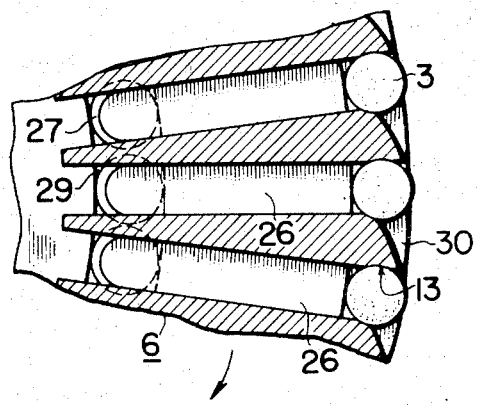
FIG. 6 is a view seen at VI—VI in FIG. 5.

The ejecting mechanism of the rotor 6 will be described hereunder particularly referring to FIGS. 5 and 6. As described above, the rotor 6 has a number of recesses 13 at the periphery thereof for receiving the articles 3. The height and peripheral shape of the recess 13 are so designed as to just fit those of the article 3, and the bottom of the recess 13 is constituted by the smooth surface 30 of a stationary platform 31 fixed below and along the periphery of the rotor 6. Behind each recess 13 is provided a slot having the same height as that of the recess and extending in the radial direction of the rotor, and a push member 26 loosely fitted in each slot. The push member 26 is provided with a cam roller 27 under one end portion thereof, and the cam roller 27 is loosely fitted in a groove 29 provided in a stationary cam block 28. It will be noted that the platform 31 is also level with the surface of the supply disk 5 for facilitating the transfer of the article 3 from the disk 5 to the rotor 6.

The delivery of the article 3 from the rotor 6 to the finger 9 is performed in the following manner. When an article 3 carried in the rotating rotor 6 approaches the moving line of fingers 9, the push member 26 guided by the groove 29 commences to push the article. At the point 32 (FIG. 4), the article 3 is completely pushed out from the recess 13 of the rotor 6 and received by the opposite finger 9 to be carried to the next stage of the machine.

Figure 8:
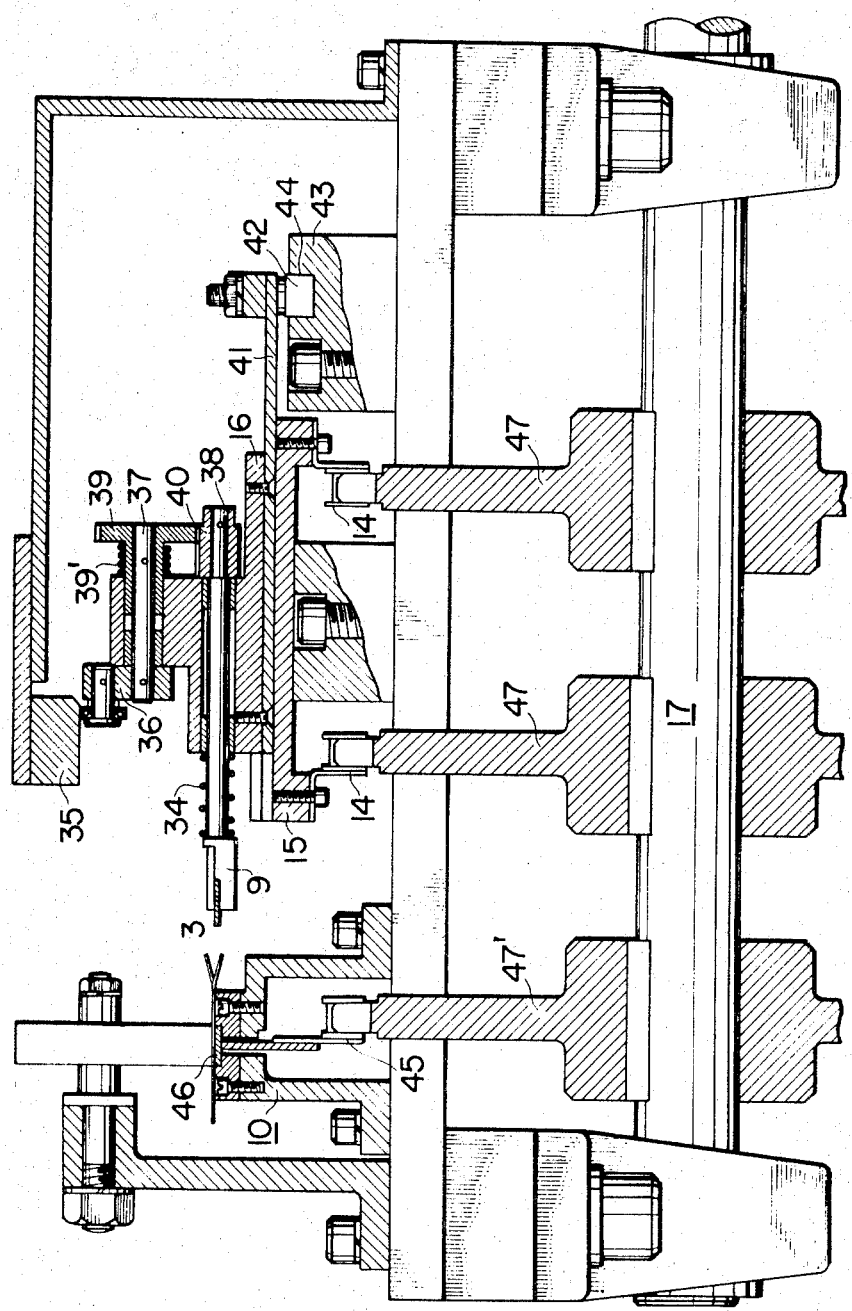
FIG. 8 is a partly-sectioned elevation of another part of the machine.

The next stage of the process is to couple the article 3 with the wire member 1. With particular reference to FIG. 8, the previously-mentioned slide block 16 is supported by the attachment 15 carried by the endless chains 14 in such a manner as to be able to slide along the attachment in the direction lateral to the direction of the advance of the endless chain. Further, the finger 9 supported by shaft 38 is slidably and rotatably mounted on the slide block 16 and urged in a lateral direction by a spring 34. Therefore, it will be seen that the above-described delivery of the article 3 from the rotor 6 to the finger 9 can be carried out assuredly and smoothly, as the finger 9 moves in continuous contact with the periphery of the rotor 6.

In order to effect a half round rotation of the finger 9, a lever 36 which can rock around the axis of a shaft 37 is provided, and the rocking motion of the lever 36 is transmitted to the shaft 38 through gears 39, 40 to turn the finger 9 around the axis of the shaft 38. The numbers of teeth of the gears 39, 40 are chosen so that, for example, if the lever 36 rotates a quarter round, the finger 9 rotates a half round. The end portion of the lever 36 is in contact with a face cam 35 by the medium of a ball bearing and is pressed to the cam 35 by a spring 39'. Thus, the rocking motion of the lever 36 is caused according to the rise and fall of the surface of the cam 35, resulting in the half round turn of the finger 9.

The slide block 16 is provided with a cam roller 42 at an end portion 41 thereof. The cam roller 42 is loosely fitted in a groove 44 which is provided in a block 43 fixed to the frame of the machine. Therefore, the slide block 16 with the finger 9 thereon is moved laterally under the guidance of the groove 44.

The wire member feeder 10 includes an endless chain 45 driven by the same drive shaft 17 as that for the afore-mentioned endless chains 14, and a steel belt 46 which is advanced by the endless chain 45.

In this stage of the process, the article 3 gripped by the finger 9 is thrust towards the wire member feeder 10, as the slide block 16 is shifted by means of the cam roller 42 and the groove 44, and the article 3 is inserted into the gap of the opposite one of the wire members 1 regularly placed on the steel belt 46. The article 3 and the wire member 1 coupled therewith proceed side by side, both being carried by the endless chains at the same speed, while the finger 9 is turned approximately a half round as the lever 36 rocks when it proceeds along the curved surface of the face cam 35. Therefore, the crossed end portion of the wire member 1 is twisted a half round with the article 3 in the manner as previously described in connection with FIG. 2, and the article 3 is firmly gripped by the wire member 1.

After that, the combination of article 3 and wire member, both being still held by the machine, proceeds a little further. Then, the finger 9 is retracted by means of the cam roller 42 and the groove 44, leaving the article in the grip of the wire member 1. The empty finger is circulated with the endless chains 14 to repeat the same operation cycle.

Figure 3:
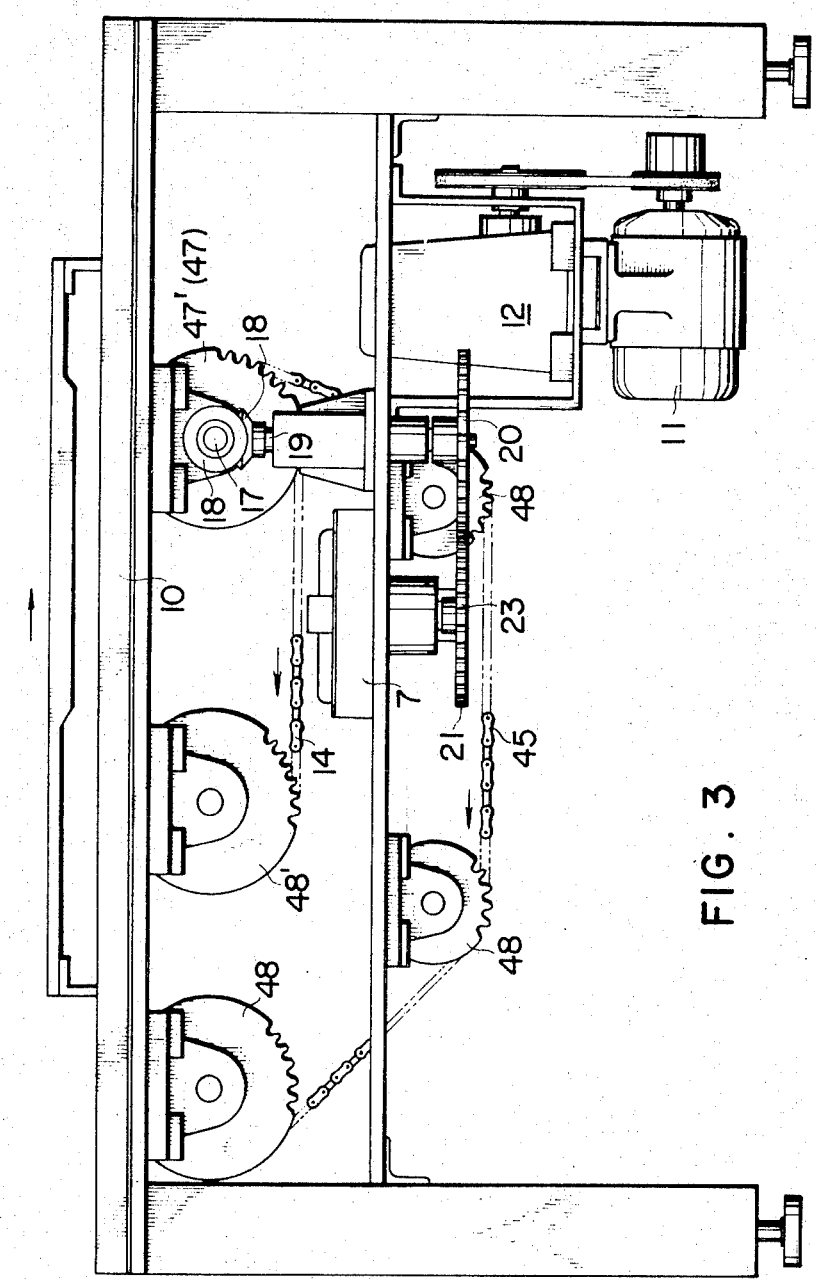
FIG. 3 is an elevation of an embodiment of the fabricating machine according to this invention.
Figure 4:
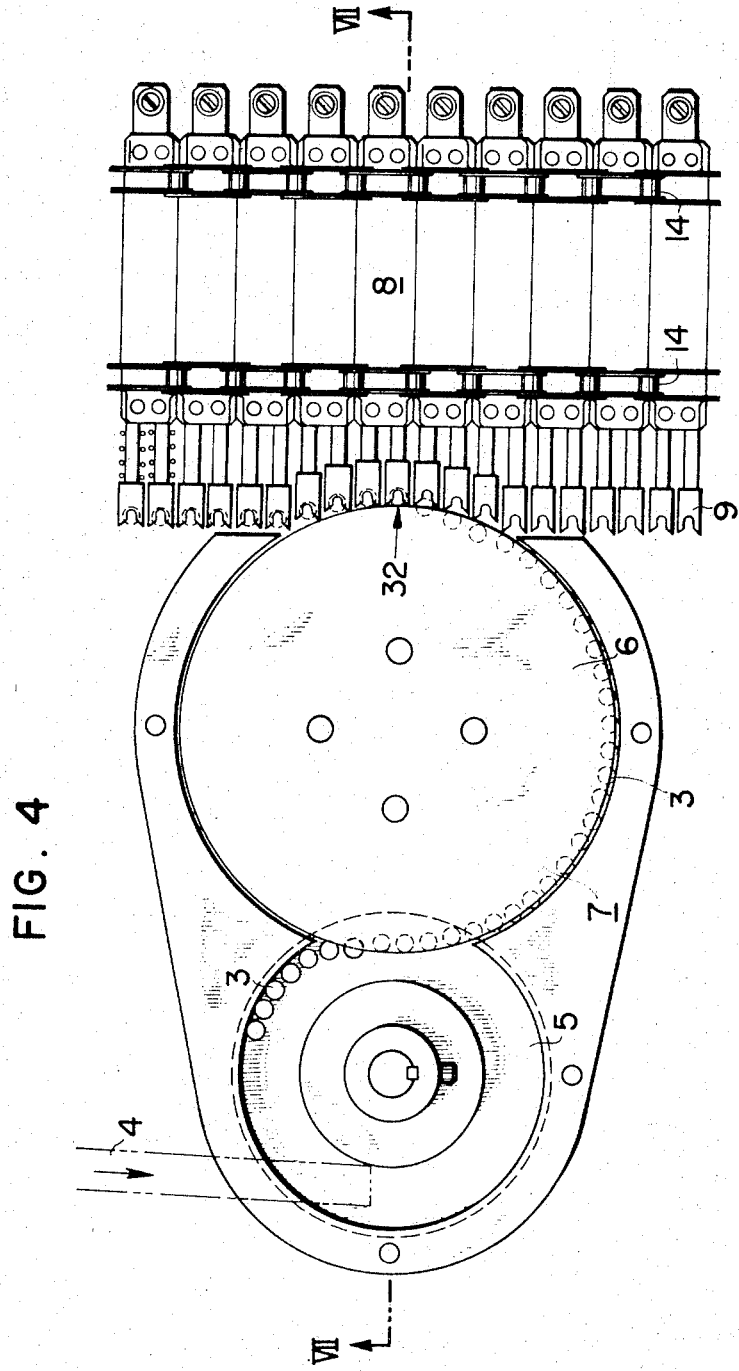
FIG. 4 is a plan view of a part of the machine shown in FIG. 3.
Figure 7:
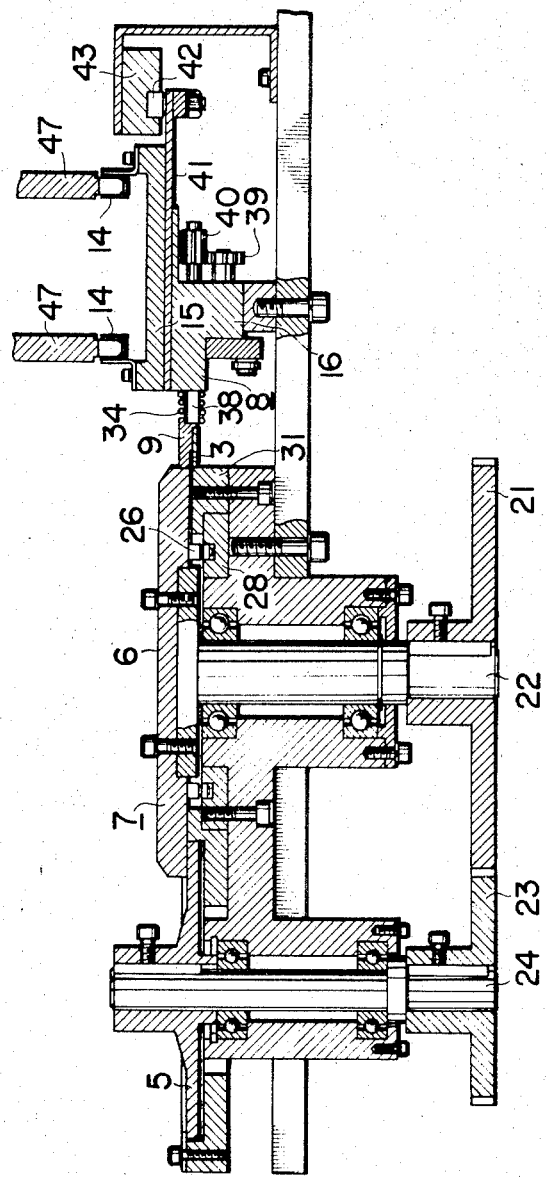
FIG. 7 is an elevation sectioned at VII—VII shown in FIG. 4.

In FIGS. 3, 7 and 8, reference numerals 47, 47' designate sprocket wheels on the driving side, and 48, 48' sprocket wheels on the driven side.

FIGS. 9a and 9b are other examples of the process according to this invention, which show the fact that the method of this invention is also applicable to articles other than a round disk.

FIG. 10a shows the preferable form of the wire member 1, which has the end portions crossed at an obtuse angle. On the other hand, FIG. 10b is an example of generally undesirable form of the wire member 1, in which both end portions are nearly aligned.

Figure 11:
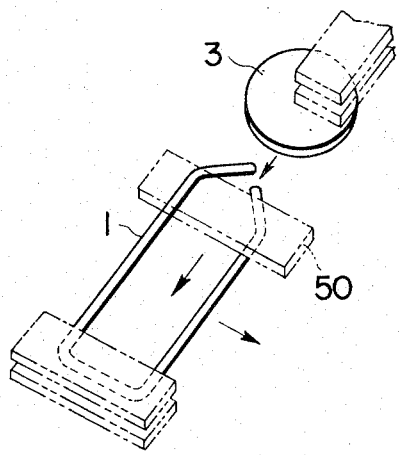
FIG. 11 is a schematic diagram illustrating another embodiment of the method of this invention.

With the above-described processes, however, there are problems that the surface of the article 3 are scratched by the tips of the wire member 1 when the article is turned against the rigidity of the wire, and also that the tips of the wire member 1 are broken during the process if the wire is made of a fragile material. Such problems are solved by the process described hereunder with reference to FIG. 11. According to this embodiment of the invention, the twisting of the wire member 1 is performed with an auxiliary tool 50 instead of the article 3 per se. Namely, the auxiliary tool 50 which is a strip of a rigid material, is first inserted through the gap at the end of the wire member 1 farther than the crossed portion thereof and turned a half round or so about the longitudinal axis of the wire member 1 to thereby reverse the levels of the tips of the wire. Then, the article 3 is inserted into the reversed gap, followed by the removal of the auxiliary tool 50 in the lateral direction. Thus, the article 3 is firmly gripped with the end portions of the wire member 1.

What we claim is:

1. A method for clamping across opposite flat surfaces of an electric element with resilient lead wires prior to soldering said resilient lead wires to said electric element, comprising the steps of: transferring said electric element from a supply rotor to one of a plurality of finger means which is then in engagement with said supply rotor, said electric element being received into a recess disposed in the periphery of said supply rotor and said plurality of finger means being arranged successively in a line and advancing in a predetermined direction; moving a series of hairpin-like wire members in synchronism with said plurality of finger means and in a direction parallel to the advancing direction of said finger means, each of said hairpin-like wire members having first and second ends wherein the second end comprises two open ends which are crossed and offset with respect to each other; thrusting said plurality of finger means perpendicularly to the advancing direction thereof so as to be positioned close to said wire members, inserting said electric element between the open ends of one of said wire members so as to be clamped therebetween; rotating each one of said finger means by approximately 180° about the longitudinal axis in the thrusting direction thereof relative to said first end while said finger means continues advancing, and retracting each one of said finger means after the completion of rotation thereof so as to leave said electric element clamped between the open ends of one of said wire members, whereby said electric element is firmly sustained by said wire members with an increased clamping force.

2. A method according to claim 1 wherein said transferring step comprises ejecting said electric element out of said recess by a pusher having a follower roller which is inserted in one of the slots disposed in said rotor in the radial direction thereof and which is guided by said roller engaged with a grooved cam provided in a cam block.

3. A method according to claim 1, wherein said finger means thrusting step comprises attaching a portion of said finger means for receiving said electric element to an attachment of a chain conveyer in a manner such that said portion slides freely in the direction perpendicular to the advancing direction of said chain conveyer, and wherein said finger means rotating step comprises rotating a shaft of a finger of each of said finger means by a gear provided at an end of said finger shaft which gear is driven by a cam lever.

* * * * *